(12) United States Patent
Martinez

(10) Patent No.: US 8,434,272 B2
(45) Date of Patent: May 7, 2013

(54) WEATHERPROOFING ASSEMBLY FOR USE WITH A SLIDE-OUT COMPARTMENT OF RECREATIONAL VEHICLE

(76) Inventor: Edward F. Martinez, Nacodoches, TX (US)

( * ) Notice: Subject to any disclaimer, the term of this patent is extended or adjusted under 35 U.S.C. 154(b) by 485 days.

(21) Appl. No.: 12/696,679

(22) Filed: Jan. 29, 2010

(65) Prior Publication Data

US 2011/0186099 A1    Aug. 4, 2011

(51) Int. Cl.
*E04B 1/346* (2006.01)
*E04B 7/16* (2006.01)

(52) U.S. Cl.
USPC ............... 52/67; 52/5; 135/88.1; 296/171; 296/172; 296/175; 296/176

(58) Field of Classification Search ............... 52/64, 67, 52/3–5; 135/88.1, 88.11, 88.12; 296/171, 296/172, 175, 176
See application file for complete search history.

(56) References Cited

U.S. PATENT DOCUMENTS

| | | | |
|---|---|---|---|
| 5,171,056 A | 12/1992 | Faludy et al. | |
| 5,190,066 A * | 3/1993 | Joergensen | 135/88.13 |
| 5,237,782 A | 8/1993 | Cooper | |
| 5,718,253 A * | 2/1998 | McNamee | 135/88.13 |
| 5,785,373 A | 7/1998 | Futrell et al. | |
| 5,860,440 A | 1/1999 | Murray et al. | |
| 5,974,740 A * | 11/1999 | Park | 52/3 |
| 6,840,568 B2 * | 1/2005 | Carrillo et al. | 296/163 |
| 2005/0269036 A1 * | 12/2005 | Weddell et al. | 160/22 |

* cited by examiner

*Primary Examiner* — William Gilbert
(74) *Attorney, Agent, or Firm* — Egbert Law Offices, PLLC

(57) ABSTRACT

A recreational vehicle with weatherproofing for a slide-out compartment has a main body, a slide-out compartment having a side wall with an upper wall, a bottom wall and a pair of end walls extending inwardly from the side wall, and a first cover having one end affixed to the side wall of the main body and an opposite end affixed to the slide-out compartment. The first cover extends over top wall and a pair of end walls of the slide-out compartment. The first cover is formed of a flexible watertight material. The first cover is affixed by bracket to the side wall of the main body and to the slide-out compartment. A second cover is affixed to the first cover and extends through a slot formed between the upper wall of the slide-out compartment and the opening of the side wall of the main body.

12 Claims, 4 Drawing Sheets

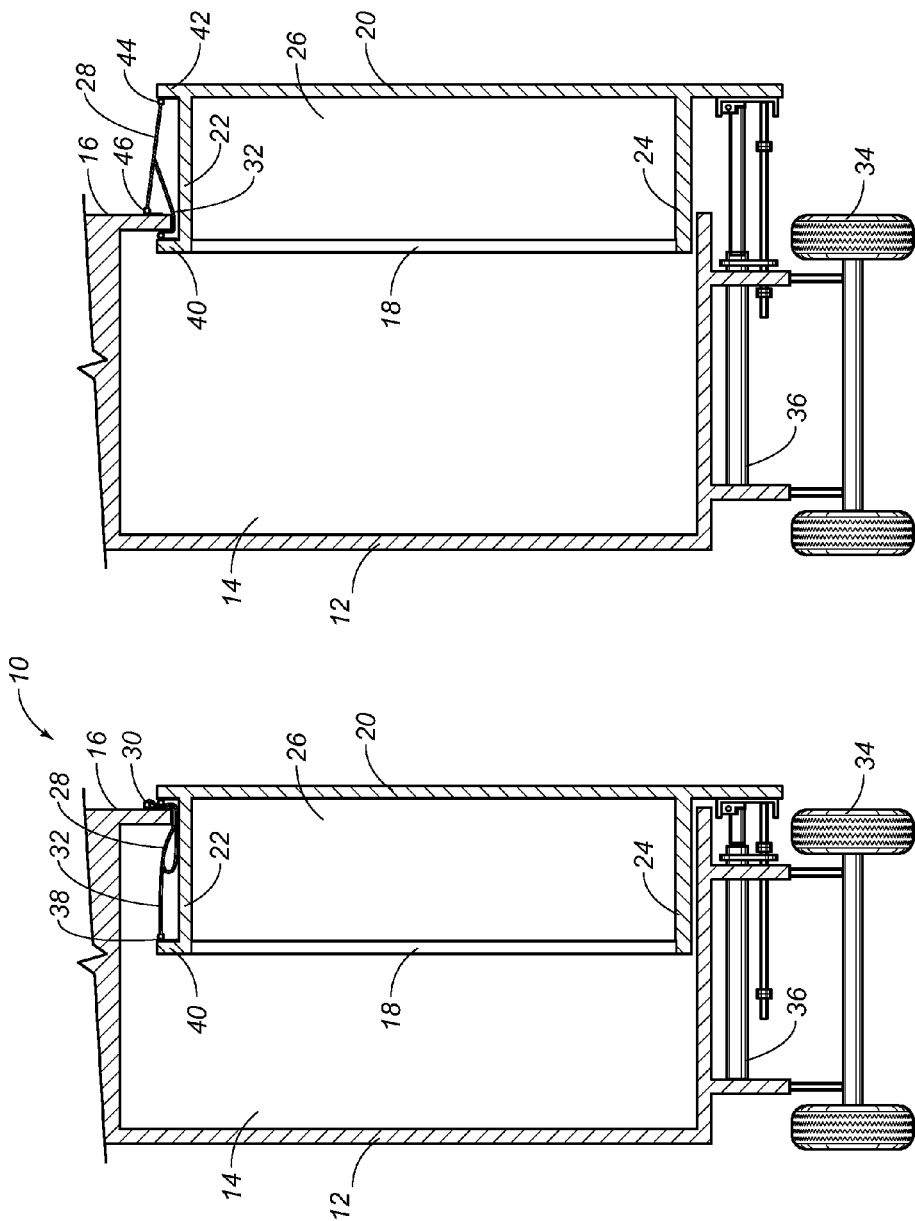

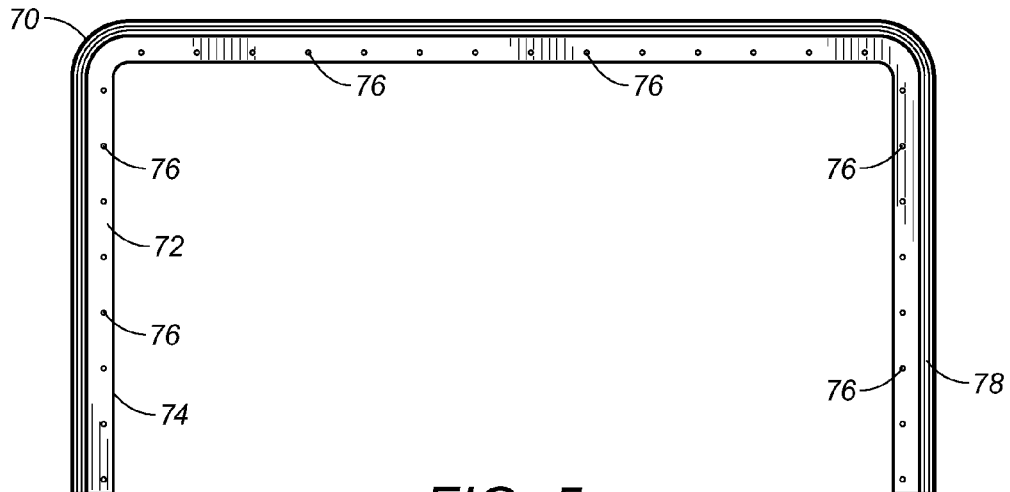
FIG. 5
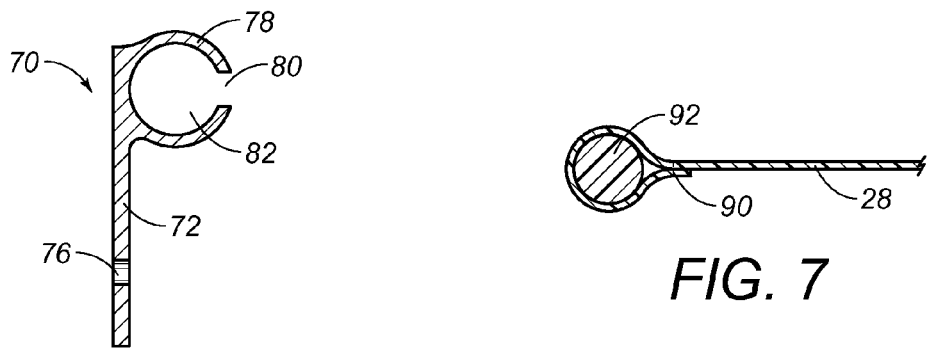
FIG. 6
FIG. 7
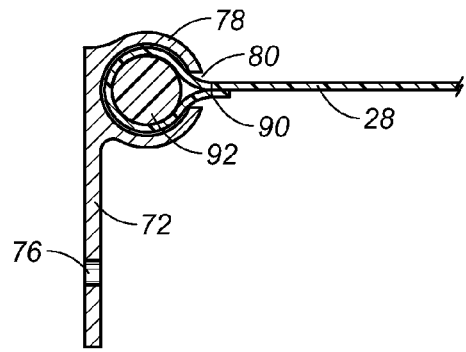
FIG. 8

WEATHERPROOFING ASSEMBLY FOR USE WITH A SLIDE-OUT COMPARTMENT OF RECREATIONAL VEHICLE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to slide-out compartments of a recreational vehicle. More particularly, the present invention is related to apparatus associated with preventing water intrusion into the interior compartment of the main body of the recreational vehicle through the space formed through the side wall of the recreational vehicle and the slide-out compartment.

2. Description of Related Art Including Information Disclosed Under 37 CFR 1.97 and 37 CFR 1.98

In order increase the available interior space of recreational vehicles, such as trailers, including those commonly referred to as "fifth wheels", slide-out rooms can be made integral with the vehicle. During transit, these rooms can be retracted and stored in the vehicle's interior. The exterior wall of the slide-out compartment is approximately flush with the exterior of the vehicle. In order to use the slide-out compartment, the vehicle is first parked and leveled. The slide-out compartment is then slid outwardly from the vehicle so as to increase the interior space of the vehicle.

A problem with slide-out compartments is that during transit and under adverse conditions such as rain, sleet or snow, water tends to leak into the interior of the vehicle in the area between the slide-out compartment and the side wall of the vehicle. Water can even leak into the vehicle when the vehicle is being stored in inclement weather.

Water intrusion into the interior of the main body of the recreational vehicle is a common complaint by recreational vehicle owners. A variety of techniques have been attempted in the past in order to prevent such water intrusion. Unfortunately, these techniques have proven to be ineffective. For example, awnings have been extended over the top wall of these slide-out compartment so as to prevent water from directly hitting the top wall and draining into the interior of the vehicle. Unfortunately, these awnings do not successfully prevent water intrusion through the space between the end wall of the slide-out compartment and the opening of the main body of the vehicle. Additionally, when wind and rain occur, the wind can blow the water between the spaces between the awning and the top wall of the slide-out compartment.

In other circumstances, rubber flaps can extend from the side wall of the recreational vehicle so as to press against the top wall of the slide-out compartment. Unfortunately, these rubber flaps or gaskets often fail to completely seal the opening between the top wall and the side wall of the vehicle. In certain circumstance, they often tend to create a "funnel" effect so as to direct water into the interior of the recreational vehicle. These rubber brackets tend to become worn over time and become ineffective.

Continued water intrusion into the interior compartment of the recreational vehicle can create mold and other damage to the interior of the vehicle. The presence of black mold caused by such liquid intrusion can often result in lawsuits against recreational vehicle manufacturers and distributors. In certain circumstances, the liquid intrusion can also ruin electronic equipment stored in the vicinity of the slide-out compartments. As such, a strong need has occurred in order to prevent liquid intrusion into the interior of the recreational vehicle.

In the past, various patent have issued relating to slide-out compartments of recreational vehicle and ways of preventing liquid intrusion therein. For example, U.S. Pat. No. 5,171,056 issued on Dec. 15, 1992 to Faludy et al., describes a retractable awning for a slide-out unit of a mobile home. This retractable awning includes an awning sheet that is secured along an inner edge to the side of the mobile home with the opposite edge being secured to a torsionally-biased roll bar rotatably disposed on the outer ends of support arms pivotally mounted to the outer face of the slide-out unit. A flexible tie-down strap secures the awning in an extended position with the support arms projecting substantially horizontally away from the outer wall. Upon release of the tie-down strap, the awning automatically retracts to a position immediately adjacent to the outer wall of the slide-out unit.

U.S. Pat. No. 5,237,782, issued on Aug. 24, 1993 to D. R. Cooper, describes a slidable room assembly having an improved slide-out assembly and an improved liquid sealing assembly at an interface between an opening in the recreational vehicle and an exterior wall of the slide-out room. The slide-out assembly includes a stationary main frame assembly having a pair of support members held in a fixed parallel relationship, a single transmission mechanism fixedly interposed between the support members, and a slidable support assembly slidably retained in the pair of support members for extending and contracting the room. The liquid sealing assembly is disposed around the interface between the slidable room and the opening in the recreational vehicle's exterior wall. A first flange member is affixed to a top edge and side edges of the slidable room's exterior wall. The flange member includes adjacent protrusions for inhibiting the flow of liquid therebetween when the slidable room is fully retracted into the recreational vehicle.

U.S. Pat. No. 5,785,373, issued on Jul. 28, 1998 to Futrell et al., teaches a recreational vehicle with a slide-out room. A longitudinal skid pad assembly supports the inside of the room on the floor of the motor home. Latches on the side walls of the motor home engage anchors secured to the floor of the motor home to retain the room in the retracted position.

U.S. Pat. No. 5,860,440, issued on Jan. 19, 1999 to Murray et al., shows a retractable awning that can be used on mobile homes having a slide-out units. The awning is mounted on the side of the vehicle and has longitudinally extensible support arms that support a roll bar having the outer edge of an awning sheet secured thereto with the inner edge being secured to the side wall of the vehicle. The awning is movable between a retracted position adjacent to the side wall of the vehicle and an extended position with the support arms being biased toward their extended position with internal gas springs so that the initial movement of the awning from the retracted to the extended position allows the support arms to automatically longitudinally extend so as to provide a large arc for the roll bar.

U.S. Pat. No. 6,840,568, issued on Jan. 11, 2005 to Carrillo et al., provides a slide-out room and awning assembly for a recreational vehicle. The assembly includes a roll enclosure for attachment to an exterior side wall of the vehicle, a roll rotationally journalled within the roll enclosure, a slide-out room for extension from the exterior side wall, an elongated trough attached to the slide-out room, and an awning fabric attached at a proximate edge to the roll and attached at a distal edge to the elongated trough. When the slide-out room is in a retracted position, the awning fabric is wrapped around the roll. When the slide-out room is in an extended position, the awning fabric is extended from the roll over a top wall of the slide-out room at a downward slope from the roll to the trough such that debris and liquid flow into the trough.

It is an object of the present invention to provide a weather proofing assembly for a slide-out compartment of a recreational vehicle which effectively prevents water intrusion into the interior compartment of the main body of the recreational vehicle.

It is another object of the present invention to provide a weather proofing assembly which neatly retracts and extends with the movement of the slide-out compartment.

It is another object of the present invention to provide a weather proofing assembly which employs a minimal number of mechanical mechanisms.

It is still a further object of the present invention to provide a water proofing assembly which is easy to install, to easy manufacture and relatively inexpensive.

These and other objects and advantages of the present invention will become apparent from a reading of the attached specification and appended claims.

BRIEF SUMMARY OF THE INVENTION

The present invention is an apparatus comprising a main body having an interior volume, a slide-out compartment positioned in an opening in the side wall of the main body so as to be movable between a stowed position and a deployed position, and a first cover having one end affixed to the side wall of the main body and an opposite end affixed to the slide-out compartment. The slide-out compartment has a side wall with an upper wall and a bottom wall and a pair of end walls extending inwardly therefrom. The slide-out compartment has an interior opening to the interior volume of the main body.

In the present invention, the side wall of the slide-out compartment has a flange extending upwardly of the upper wall. The opposite end of the first cover is affixed to this flange. The first cover extends angularly downwardly from the side wall of the main body toward the slide-out compartment. The first cover extends over the top wall and the pair of end walls of the slide-out compartment when the slide-out compartment is in the deployed position. The side wall of the slide-out compartment has a flange extending outwardly of the upper wall and outwardly of the pair of end walls. The opposite end of the first cover affixed to this flange.

In the present invention, the first cover is formed of a flexible watertight material.

The present invention further includes a first bracket affixed to the side wall of the main body adjacent the opening of the side wall of the main body, and a second bracket affixed to the slide-out compartment. The end of the first cover is received by the first bracket. The opposite end of the first cover is received by the second bracket. Each of the first and second brackets includes a flange having a C-shaped member connected thereto. The C-shaped member has a slot facing away from the flange. The first cover has a hem formed along an edge thereof. The first cover has a rod received within the hem. The rod is received within the C-shaped member such that the first cover has a portion extending through the slot. The flange has a plurality of holes formed therein in spaced relation to each other. A plurality of fasteners are respectively received by the plurality of holes so as to allow each of the brackets to be properly affixed to either the main body of the recreational vehicle or to the slide-out compartment.

The present invention further includes a second cover having a one end affixed to the first cover and a opposite end affixed to the slide-out compartment away from the side wall of the slide-out compartment. The slide-out compartment has a flange at an end of the slide-out compartment opposite the side wall thereof. The opposite end of the second cover affixed to this flange. The flange is positioned on the slide-out compartment within the interior volume of the main body. One end of the second cover is affixed to the first cover at a location between the ends of the first cover. The opening of the side wall of the main body defines a slot with respect to the upper wall of the slide-out compartment. The second cover has a portion extending through the slot.

BRIEF DESCRIPTION OF THE SEVERAL VIEWS OF THE DRAWINGS

FIG. 1 is a cross-sectional view of the recreational vehicle with the slide-out compartment in a stowed position.

FIG. 2 is a cross-sectional view of the recreational vehicle showing the slide-out compartment in a deployed position.

FIG. 5 is an isolated view of the bracket used to secure the weatherproofing apparatus to the slide-out compartment or to the main body of the recreational vehicle.

FIG. 6 is a cross-sectional view of the bracket shown in FIG. 5.

FIG. 7 is an isolated view showing the cover of the present invention with a rod secured in a hem at an end thereof.

FIG. 8 is a cross-sectional view showing the installation of the cover within the bracket.

DETAILED DESCRIPTION OF THE INVENTION

Figure 3:
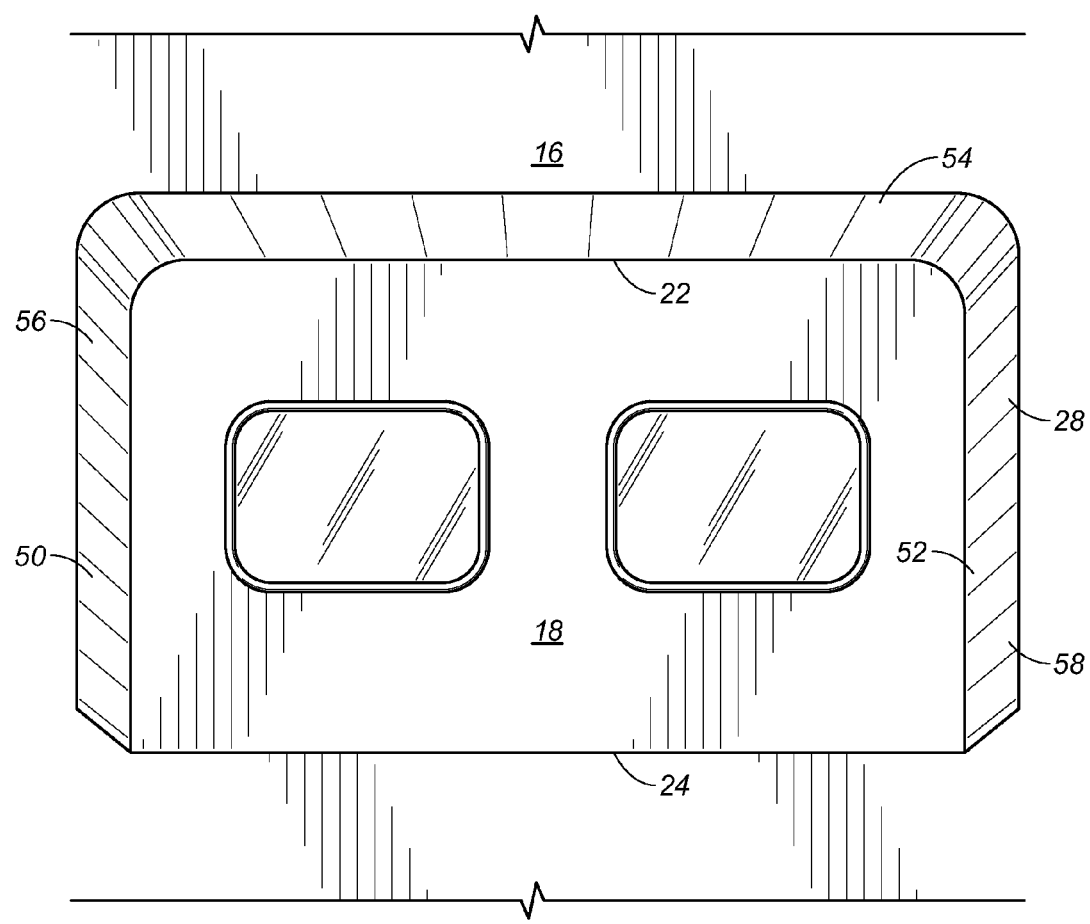
FIG. 3 is a side elevational view showing the side wall of the slide-out compartment and the recreational vehicle with the weatherproofing apparatus secured therebetween.

Referring to FIG. 1, there is shown the apparatus 10 in accordance with the teachings of the present invention. The apparatus 10 includes a main body 12 having an interior volume 14. The main body 12 has a side wall 16. A slide-out compartment 18 is shown in its stowed position within the interior volume 14 of the main body 12. The slide-out compartment 18 has a side wall 20 adjacent to the side wall 16 of the main body 12. The slide-out compartment 18 also has a top wall 22 and a bottom wall 24 extending transversely to the side wall 20. The upper wall 22 and the bottom wall 24 are shown as extending into the interior volume 14 of the main body 12. The slide-out compartment has an interior 26 that opens to the interior volume 14 of the main body 12. The slide-out compartment is positioned in an opening formed in the side wall 16.

Importantly, there is a first cover 28 that has one end 30 affixed to the side wall 16 of the main body 12 and an opposite end affixed to the slide-out compartment 18. A second cover 32 is affixed at one end to the first cover 28 and at opposite end to the slide-out compartment 18.

In FIG. 1, it can be seen that the main body 12 is the main body of a recreational vehicle. Wheels 34 allows the recreational vehicle to transverse a road or other underlying surface. An actuator mechanism 36 is positioned adjacent to the bottom wall 24 of the slide-out compartment 18 so as to move the slide-out compartment from the retracted position (as shown in FIG. 1) to the deployed position (as shown in FIG. 2).

Importantly, in FIG. 1, it can be seen that the unique arrangement between the first cover 28 and the second cover 32 allows the first cover 28 to be drawn through the slot formed between side wall 16 of the main body 12 and the slide-out compartment 18. In particular, the opposite end of the second cover 32 is attached to a bracket 38 that is secured to a flange 40 formed on an inner edge of the top wall 22 of the slide-out compartment 18. A suitable fastener is used so as to affix the bracket 38 to the flange 40. This fastener can be in the nature of a screw, a bolt, a welding or other device. As such, when the slide-out compartment 18 is in its stowed position, the first cover 28 is drawn through the slot formed between the slide-out compartment 18 and the side wall 16 so as to be neatly retained within the interior volume 14 of the main body 12. Since the first cover 28 and the second cover 32 reside over the upper wall 22, they are generally out of view of persons within the interior volume 14. Fundamentally, the movement of the flange 40 with the movement of the slide-out compartment 18 draws the second cover 32 inwardly and, at the same time, draws the first cover 28 inwardly through the slot. No other special retracting mechanisms, roll bars or other mechanical mechanisms are required so as to proper stow the covers 28 and 32.

FIG. 2 shows the slide-out compartment 18 in its deployed position. The slide-out compartment 18 is urged by the actuator 36 outwardly of the opening formed in the side wall 16 of the main body 12. As can be seen, this greatly expands the interior volume 14 of the recreational vehicle.

In FIG. 2, it can be seen that there is flange 42 extending upwardly of the side wall 20 of the slide-out compartment 18. The first cover 28 is secured to a bracket 44 positioned on flange 42. One end of the first cover 28 is secured to the bracket 44 while the opposite end 46 of the first cover 28 is affixed to a bracket formed on the side wall 16 of the main body 12. In this configuration, the first cover 28 extends rather taught. The first cover 28 angles downwardly from the side wall 16 to the flange 42. This creates a trough which tends to cause water to drain away from the interior volume 14 and toward the sides of the slide-out compartment 18. As such, liquid intrusion into the interior volume 14 through the top wall 22 is effectively prevented.

FIG. 2 shows that the second cover 32 has one end affixed to the first cover 28 in a location generally between the ends of the first cover 28. The opposite end of the second cover 32 is secured to the flange 40 on the interior compartment 18. The flange 40 resides generally against the inner surface of the side wall 16 of the main body 12. It can be seen that the second cover 32 extends through the slot formed by the opening of the side wall 16 and the top wall 22.

The first cover 28 can be formed of a flexible watertight material, such as a polymeric material. Experiments have shown that an elastic material is not best way forming the first cover 28. Elastic material will tend to have pores which allow water intrusion. As such, the first cover 28 is generally inelastic. Since the second cover 32 is not exposed to the elements, it is not critical that the second cover 32 be of a watertight material.

Importantly, the preferred embodiment of the present invention is not simply to cover the top wall 22 of the slide-out compartment 18. In order to effectively prevent liquid intrusion through the spaces between the slide-out compartment and the side wall 16 of the main body 12, the first cover 28 should also extend across each of through end walls 50 and 52 of the slide-out compartment 18. As can be seen in FIG. 3, the first cover 28 is shown in its extended position since the slide-out compartment 18 is in its deployed position. The first cover has a first surface 54 that extends over the top wall 22 of the slide-out compartment 18. A second surface 56 that extends over one of the end walls 50 of the slide-out compartment 18. Another surface 58 extends over the other end wall 52 of the slide-out compartment 18.

Within the concept of the present invention, it is not important that the first cover 28 extends over the bottom wall 24. Since the bottom wall 24 is not exposed to the elements, it very difficult to have liquid intrusion therethrough. Additionally, the bottom wall 24 will be generally in close proximity to the slide surface of the main body 12 of the recreational vehicle. The weatherproofing apparatus of the present invention is intended, in its preferred embodiment, to cover three sides of the slide-out compartment. In other words, the weatherproofing apparatus covers the top wall and each of the end walls of the slide-out compartment.

FIG. 3 is an isolated view showing the arrangement of the first cover 28 at a corner 60 of the slide-out compartment 18. There is a cut-out view in FIG. 4 which illustrates how the second cover 32 is configured. Initially, it can be seen that there is slot 62 that is formed between the side wall 16 of the main body 12 of the recreational vehicle and the upper wall 22 of the slide-out compartment 18. Similarly, there is another slot 66 formed between the side wall 16 and the end wall 52 of the slide-out compartment 18. The second cover 32 will extend through the slots 62 and 64 and will be secured to the flange 40 which extends across the top wall 22 and across the side walls 50 and 52.

Figure 4:
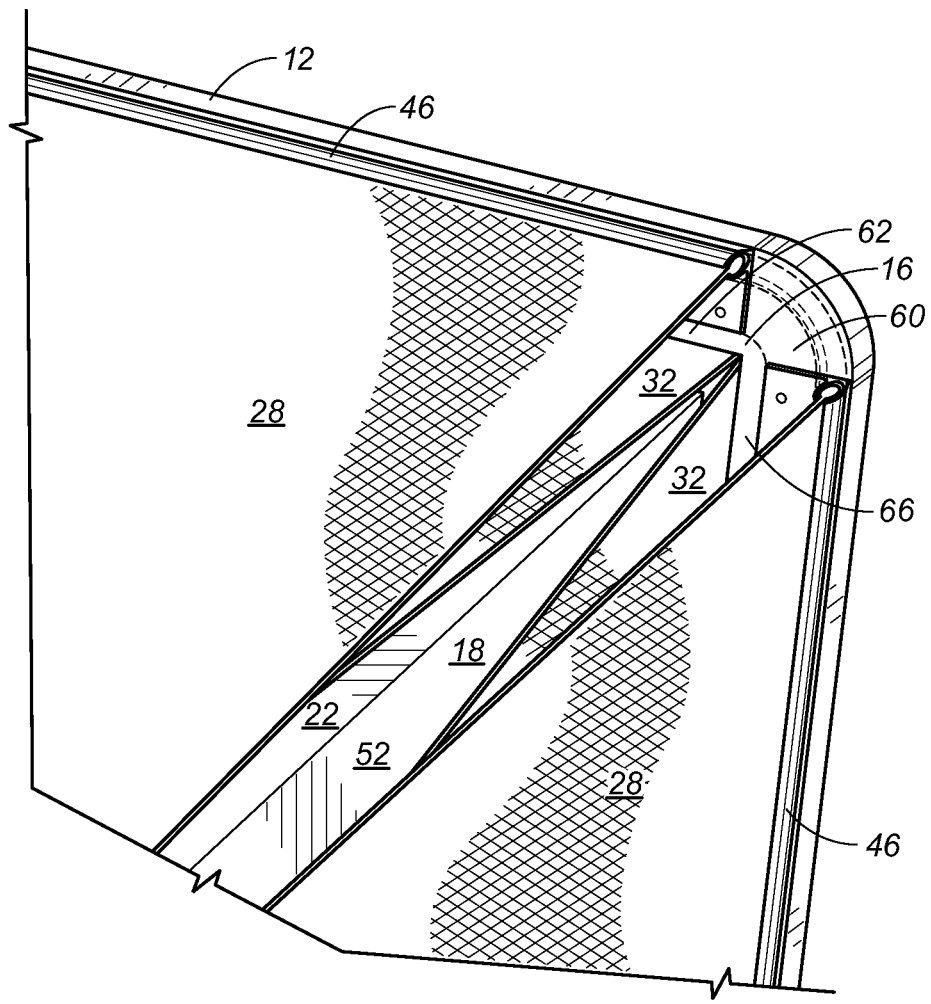
FIG. 4 is a partially cut-away view of the weatherproofing apparatus of the present invention as shown at a corner of the slide-out compartment.

In FIG. 4, it can be seen that the slide-out compartment 18 is in its deployed position. As such, the cover 28 is taught and angled downwardly toward the slide-out compartment. Bracket 46 secures the end of the first cover 28 to the outer surface of the side wall 16.

FIG. 5 illustrates the bracket 70 as used in the present invention. The bracket 70 can be used as a bracket for attachment to the flange 42, as the bracket is used for attachment to the side wall 16 of the main body 12, and as the bracket for attachment to the flange 40. Each of these brackets will have a similar configuration. As such, the configuration of the bracket 70 is illustrative of the general arrangement of brackets for the attachment of the covers in the present invention.

It can be seen that the bracket 70 has a generally inverted U-shaped configuration. The bracket 70 has a flange 72 extending along an inner edge 74 thereof. The flange 72 has a plurality of holes 76 formed therethrough. Holes 76 are used to receive fasteners so that the flange 72 can be affixed directly to the surface of either the slide-out compartment or the main body 12 of the recreational vehicle. A C-shaped member 78 is connected to the flange 72 and extends therearound. The C-shaped member 78 is intended to receive the outer edges of either the first cover 28 or the second cover 32.

FIG. 6 is a cross-sectional view of the bracket 70. As can be seen in FIG. 6, the flange 72 has a hole 76 formed therethrough. The flange 72 is generally flat so as to have a surface to position against either the slide-out compartment or the side wall of the main body of the recreational vehicle. The C-shaped member 78 is illustrated as extending from the flange 72 so as to have a slot 80 opening into the interior 82 of the C-shaped member.

FIG. 7 shows the cover 28 as having a hem 90 along an end thereof. Hem 90 forms an opening into which a flexible rod 92 can be inserted. The flexible rod 92 provides a mounting means whereby the end of the cover 28 can be inserted into the C-shaped member 78 of the bracket 72. FIG. 8 illustrates this configuration.

In FIG. 8, it can be seen that the C-shaped member 78 is connected to the flange 38. The first cover 28 extends through the slot 80 of the C-shaped member 78. The hem 90 will extend around the rod 92 within the interior 82 of the C-shaped member 78.

In this manner, the rod and the associated end of the cover can be easily threaded along the bracket 70. As such, the arrangement of the bracket and the configuration of the cover permits easy assembly of the present invention. Although the cover 28 is illustrated in FIGS. 7 and 8, the same structure is applicable with respect to the second cover 32.

For installation, it is only necessary to fasten the bracket to an appropriate surface on the recreational vehicle and to thread the rod 92, and the associated hem 90, through the C-shaped member 78. As such, both installation and removal can be completed quickly and with a minimum of effort.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
a main body having an interior volume, said main body having a side wall;
a slide-out compartment having a side wall with an upper wall and a bottom wall and a pair of end walls extending inwardly from said side wall of said slide-out compartment, said slide-out compartment having an interior opening to said interior volume of said main body, said slide-out compartment positioned in an opening in said side wall of said main body so as to be movable between a stowed position and a deployed position, an edge of said opening in said side wall of said main body and said upper wall of said slide-out compartment defining a slot therebetween;
a first cover having one end affixed to said side wall of said main body in a position above said slide-out compartment and an opposite end affixed adjacent said side wall of said slide-out compartment; and
a second cover having a one end affixed to said first cover in a location between the ends of said first cover, said second cover having an opposite end affixed to said slide-out compartment in a location within said interior volume of said main body, said second cover extending through said slot.

2. The apparatus of claim 1, said side wall of said slide-out compartment having a flange extending upwardly of said upper wall, said opposite end of said first cover affixed to said flange.

3. The apparatus of claim 1, said first cover extending angularly downwardly from said side wall of said main body toward said slide-out compartment.

4. The apparatus of claim 1, said first cover extending over said top wall and said pair of end walls of said slide-out compartment when said slide-out compartment is in said deployed position.

5. The apparatus of claim 4, said side wall of said slide-out compartment having a flange extending outwardly of said upper wall and outwardly of said pair of end walls, said opposite end of said first cover affixed to said flange.

6. The apparatus of claim 1, said first cover being formed of a watertight material.

7. The apparatus of claim 1, further comprising:
a first bracket affixed to said side wall of said main body adjacent said opening of said side wall of said main body; and
a second bracket affixed to said slide-out compartment, said one end of said first cover received by said first bracket, said opposite end said first cover received by said second bracket.

8. The apparatus of claim 7, each of said first and second brackets comprising:
a flange; and
a C-shaped member connected to said flange, said C-member having a slot facing away from said flange.

9. The apparatus of claim 8, said flange having a plurality of holes formed therein in spaced relation to each other, the apparatus further comprising:
a plurality of fasteners respectively received by said plurality of holes.

10. The apparatus of claim 1, said slide-out compartment having a flange at an end of said slide-out compartment opposite said side wall thereof, said opposite end of said second cover affixed to said flange.

11. The apparatus of claim 10, said flange positioned on said slide-out compartment within said interior volume of said main body.

12. An apparatus for weatherproofing a slide-out compartment of a main body of an recreational vehicle, the apparatus comprising:
a first cover formed of a flexible watertight material, said first cover having a first end and a second end;
a first bracket affixed to said first end of said first cover, said first bracket suitable for attachment to the main body;
a second bracket affixed to said second end of said first cover, said second bracket suitable for attachment to the slide-out compartment, said first bracket having a generally inverted U-shaped configuration so as to suitable for extending around an opening in the main body through which the slide-out compartment moves, said second bracket having a generally inverted U-shaped configuration so as to be suitable for extending around a top wall and opposite end of the slide-out compartment;
a second cover having one end affixed to said first cover and extending therefrom; and
a third bracket affixed to an opposite end of said second cover, said third bracket suitable for affixing to a surface of the slide-out compartment inwardly of an interior compartment of the main body, said one end of said second cover affixed to said first cover in a location generally midway between the ends thereof.

* * * * *